(12) United States Patent
Veryha et al.

(10) Patent No.: US 11,487,265 B2
(45) Date of Patent: Nov. 1, 2022

(54) SYSTEMS AND METHODS FOR SIMULTANEOUS CONTROL OF SAFETY-CRITICAL AND NON-SAFETY-CRITICAL PROCESSES IN AUTOMATION SYSTEMS USING MASTER-MINION FUNCTIONALITY

(71) Applicant: ABB AG, Mannheim (DE)

(72) Inventors: Yauheni Veryha, Mannheim (DE); Benjamin Maier, Hirschberg (DE)

(73) Assignee: ABB AG, Mannheim (DE)

( * ) Notice: Subject to any disclaimer, the term of this patent is extended or adjusted under 35 U.S.C. 154(b) by 445 days.

(21) Appl. No.: 16/677,791

(22) Filed: Nov. 8, 2019

(65) Prior Publication Data
US 2020/0073355 A1 Mar. 5, 2020

Related U.S. Application Data

(63) Continuation of application No. PCT/EP2018/056488, filed on Mar. 15, 2018.

(30) Foreign Application Priority Data

May 9, 2017 (DE) .......................... 102017109886.0

(51) Int. Cl.
*G05B 19/042* (2006.01)
*G06F 9/38* (2018.01)
(Continued)

(52) U.S. Cl.
CPC ....... *G05B 19/0428* (2013.01); *G06F 9/3877* (2013.01); *G06F 13/20* (2013.01); *G06F 13/4004* (2013.01); *G06F 2009/3883* (2013.01)

(58) Field of Classification Search
CPC .... G06F 13/20; G06F 13/4004; G06F 9/3877; G05B 19/0428; G05B 19/05;
(Continued)

(56) References Cited

U.S. PATENT DOCUMENTS 6,532,508 B2 * 3/2003 Heckel ............... G05B 19/0428
709/227
7,472,106 B2 * 12/2008 Muneta ................. G05B 19/05
(Continued)

FOREIGN PATENT DOCUMENTS

CN 102725700 A 10/2012
DE 19928517 A1 1/2001
(Continued)

OTHER PUBLICATIONS

China Intellectual Property Administration, Office Action in Chinese Patent Application No. 201880030769.4, 19 pp. (dated Apr. 14, 2022).

*Primary Examiner* — Raymond N Phan
(74) *Attorney, Agent, or Firm* — Leydig, Voit & Mayer, Ltd.

(57) ABSTRACT

A control system is for controlling safety-critical processes, non-safety-critical processes, and/or installation components. The control system includes: at least one control unit configured to control non-safety-critical processes and/or non-safety-critical installation components, at least one safety control unit for controlling safety-critical processes and/or safety-critical installation components, and at least one input/output unit connected to the first control unit via an internal input/output bus. The control system is configured to act as communication master or as communication minion or as both in a pool having other devices that is connected via field bus, and to that end, the control system includes a master communication coupler and a minion communication coupler. The control system is modularly configurable. At least the safety control unit includes respective subunits with master functionality and subunits with minion functionalities.

10 Claims, 4 Drawing Sheets

(51) Int. Cl.
*G06F 13/20* (2006.01)
*G06F 13/40* (2006.01)

(58) Field of Classification Search
CPC .. G05B 19/045; G05B 19/054; G05B 19/052; G05B 19/056; G05B 19/058; G05B 19/048

See application file for complete search history.

(56) References Cited

U.S. PATENT DOCUMENTS

| | | | | |
|---|---|---|---|---|
| 7,783,915 | B2* | 8/2010 | Hauf | G05B 19/0428 |
| | | | | 714/24 |
| 7,802,150 | B2* | 9/2010 | Meyer-Grafe | H04L 1/00 |
| | | | | 714/48 |
| 8,509,927 | B2* | 8/2013 | Schmidt | G05B 19/0428 |
| | | | | 700/79 |
| 9,104,190 | B2* | 8/2015 | Neupartl | G05B 19/0428 |
| 2002/0093951 | A1 | 7/2002 | Rupp et al. | |
| 2002/0126620 | A1 | 9/2002 | Heckel et al. | |
| 2005/0149207 | A1* | 7/2005 | Esch | G05B 19/042 |
| | | | | 700/79 |
| 2006/0200257 | A1 | 9/2006 | Kirste et al. | |
| 2012/0296446 | A1* | 11/2012 | Neupartl | G05B 19/0428 |
| | | | | 700/1 |

FOREIGN PATENT DOCUMENTS

| | | |
|---|---|---|
| DE | 102005009795 A1 | 9/2006 |
| DE | 102009054157 B3 | 4/2011 |
| EP | 2767877 A1 | 8/2014 |
| EP | 2876510 A1 | 5/2015 |

* cited by examiner

SYSTEMS AND METHODS FOR SIMULTANEOUS CONTROL OF SAFETY-CRITICAL AND NON-SAFETY-CRITICAL PROCESSES IN AUTOMATION SYSTEMS USING MASTER-MINION FUNCTIONALITY

CROSS-REFERENCE TO PRIOR APPLICATIONS

This application is a continuation of International Patent Application No. PCT/EP2018/056488, filed on Mar. 15, 2018, which claims priority to German Patent Application No. DE 10 2017 109 886.0, filed on May 9, 2017. The entire disclosure of both applications is hereby incorporated by reference herein.

FIELD

The present invention relates to a control system. The control system can be of modular design and intended to control safety-critical and non-safety-critical processes and/or installation components. The invention can used in process automation or machine control.

BACKGROUND

Automation systems for controlling a technical process or a technical installation often require particularly safety-critical process or installation components to be controlled separately from non-safety-critical components.

DE 10 2005 009 795 A1 describes a microprocessor system for machine control in safety-critical applications that has two areas. A first area is intended for non-safety-critical or non-safety-oriented functions and comprises a main processor, a program and data memory, an input/output unit and a bus for connecting the aforementioned components to one another. A second area is intended for safety-critical or safety-oriented functions and comprises a safety processor having a program and data memory of its own, which is likewise connected to the bus.

A secure transmission link is used to load programs and data into the data memory of the safety processor, the function of which involves it taking the installation or the process into a "safe" state in an emergency in conjunction with further safety-oriented components, such as for example safety-oriented input/output units.

DE 103 53 950 A1 describes a further control system for controlling safety-critical processes having a field bus, a bus master for controlling the communication by the field bus and a signal unit for linking to the safety-critical process. The bus master and the signal unit are connected to one another via the field bus. The field bus is used to provide communication by the signal unit with the bus master. Furthermore, a first control unit is intended to control the safety-critical process, wherein the signal unit and the first control unit have safety-oriented devices for fail safe communication in order to control the safety-critical processes. The first control unit is connectable to the bus master independently of a field bus.

The safety-oriented control systems described above are not intended for use in control systems of modular design, as are described in DE 10 2004 056 363 A1, for example, and are integrable only with additional effort, since for example communication modules, interfaces, power supplies and monitoring functions must be matched to the prescribed safety criteria. This requires these components to be replaced and equipped with new software, resulting in considerable costs.

EP 2504739 A1 describes an automation system of modular design for controlling safety-critical and non-safety-critical processes and/or installation components. In this case, a non-safety-oriented control system of modular design is additionally equipped with a safety-oriented controller, the control system being designed to act as communication master.

The prior art leaves room for improvements. Therefore, a need for the present invention exists.

SUMMARY

In an embodiment, the present invention provides a control system for controlling safety-critical processes, non-safety-critical processes, and/or installation components. The control system includes: at least one control unit configured to control non-safety-critical processes and/or non-safety-critical installation components, at least one safety control unit for controlling safety-critical processes and/or safety-critical installation components, and at least one input/output unit connected to the first control unit via an internal input/output bus. The control system is configured to act as communication master or as communication minion or as both in a pool having other devices that is connected via field bus, and to that end, the control system includes a master communication coupler and a minion communication coupler. The control system is modularly configurable. At least the safety control unit includes respective subunits with master functionality and subunits with minion functionalities.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

In accordance with a first exemplary embodiment, a control system, preferably of modular design, for controlling safety-critical and non-safety-critical processes and/or installation components comprises at least one first control unit intended to control the non-safety-critical process and/or or the non-safety-critical installation components, and also at least one input/output unit connected to the first control unit via an internal input/output bus, and at least one communication coupler connected to the first control unit via an internal coupler bus and/or connectable to further local units, such as for example input/output units and/or remote stations, via a field bus.

In this case, there is provision for at least one second control unit, subsequently also referred to as safety control unit or safety controller, for controlling the safety-critical process(es) and/or the safety-critical installation components.

The control system is designed to act as communication master or as communication minion or as both in a pool having other devices that is connected via field bus, and to that end comprises a master communication coupler and a minion communication coupler, and it is preferably modularly configurable; at least the safety control unit has respective subunits with master functionality and subunits with minion functionalities.

Preferably, the safety control unit has at least two processing units, preferably embodied as a microprocessor, to provide the safety-oriented functions and a first memory, preferably embodied as a dual port RAM, for data transmission via the internal coupler bus. The dual port RAM in the safety control unit is embodied so that simultaneous read and/or write access operations are possible on its two access sides, so that simultaneous access is possible for two otherwise separate systems using shared data without the otherwise separate systems limiting one another in terms of access speed.

The control system is equipped with master and minion functionality. To this end, the control system has both respective master and minion communication coupler functionality. In this case, the two functionalities can also be combined in a communication coupler that can act both as a master communication coupler and as a minion communication coupler simultaneously or quasi-simultaneously. Accordingly, said communication coupler can be provided as a module that functions both as a master communication coupler and as a minion communication coupler.

The control system can therefore be connected to other control systems via field bus to form a complex pool having other control systems and/or other field bus devices. In particular, a control system in accordance with exemplary embodiments can function "upwards" as a minion and receive commands from another control system, optionally likewise in accordance with exemplary embodiments, that functions as a master. At the same time, this control system functioning upwards as a minion can in turn function "downwards" as a master control system and send commands to a further control system, which then functions as a minion. Similarly, other field bus devices can function as a minion and receive commands from each of the aforementioned control systems, which in this case each function as a master.

In this manner it is possible for a pool having one or more control systems in accordance with exemplary embodiments to be constructed in modular and highly flexible fashion, each of the control systems being able to act either as a master or as a minion or in both roles. In this case, in exemplary embodiments, the role of the master or minion can be stipulated depending on the context, i.e. depending on the function and/or role of the respective communication partner connected via field bus, be it another control system, an arbitrary field bus device or the like.

While the interaction of a control system in accordance with exemplary embodiments with other control systems in accordance with exemplary embodiments, or with other controllers connected to the field bus, or with other field bus devices is stipulated, in accordance with the invention, by the configuration of the master/minion communication coupler(s) of the control system, the master/minion property is typically also realized in other modules or parts of the control system in accordance with exemplary embodiments. In particular, the second control unit, the safety control unit, can comprise one or more respective master safety subunits and/or minion safety subunits. Similarly, the first control unit, which is intended to control the non-safety-critical process(es) and/or the non-safety-critical installation components, can likewise comprise one or more respective master and/or minion subunits.

In accordance with one exemplary embodiment, the safety control unit communicates, optionally using a dual port RAM, directly with further communication couplers of other control systems, which are optionally likewise embodied in accordance with exemplary embodiments, via the internal coupler bus by means of or via the non-safety-critical first control unit. In this case, the safety control unit in accordance with the above embodiments can function either as a master or as a minion in any connection to other systems, the respectively connected other control systems each functioning or being designed in conjugate fashion with respect thereto.

Such a control system of modular design having a first control unit for controlling non-safety-critical applications and a second control unit (safety control unit) for controlling safety-critical applications, and also the master/minion functionality described above, can be used flexibly in different functions, for example as a control system of a larger automation system in conjunction with further control systems in accordance with exemplary embodiments, as a local processing device in a decentralized larger automation system of this kind, or as a standalone automation device in conjunction with the locally couplable input/output devices or as a central automation device.

A further advantage of the control system in accordance with exemplary embodiments involves a reduction in the interfaces for the communication of the respective control units for the safety-critical and non-safety-critical functions. The use of the safety control unit for controlling the safety-critical process(es) or the safety-critical installation components and the associated separation of the functions between the first, non-safety-oriented control unit and the safety control unit means that the existing communication interfaces in the safety control unit to the non-safety-oriented control unit are reused, resulting in significant simplification of the design of the safety control unit. In this case, it is found to be advantageous that the dual port RAMs used make predefined interfaces available.

In this case, in embodiments (i.e., examples), the non-safety-oriented control unit performs the task of transferring the safety-oriented messages from the safety control unit of the control system to the safety-oriented input/output units via an internal coupler bus and the internal input/output bus or the communication coupler embodied as a master communication coupler and/or as a minion communication coupler (the two for or on the field bus) during a system setup by using what is known as the "black channel communication principle". The black channel communication principle is known for example from "PROFIsafe—Profile for Safety Technology on PROFIBUS DP and PROFINET IO Profile part, related to IEC 61784-3-3 Specification for PROFIBUS and PROFINET. Version 2.4, March, 2007, Order No: 3.192b".

The field bus master communication couplers are furthermore intended to transmit the safety-oriented messages from and to the local safety-oriented input/output modules and/or to the remote stations by using the aforementioned "black channel communication principle", or to receive said messages as a field bus minion communication coupler. To this end, the messages are routed to the safety-oriented input/output units via one or more, what are known as field bus minions. The field bus minions can have direct non-safety-oriented input/output channels for this purpose.

What is known as safety program logic is executed in the safety control unit. Non-safety-oriented program logic is executed separately therefrom in the controller for the non-safety-critical applications. The—possibly reciprocal—data interchange of the data for the safety-critical applications between the safety control unit and the non-safety-oriented first control unit is effected in this case by means of the predefined interface via the dual port RAM and the coupler bus, specifically irrespective of whether this takes place in the master mode or in the minion mode.

In exemplary embodiments, of the two processors of the safety control unit, only one processor is connected directly to the internal coupler bus via the dual port RAM in this case. The processors of the safety control unit are embodied such that they monitor and synchronize one another. The monitoring and synchronization mechanisms can be embodied for example according to "PROFIsafe—Profile for Safety Technology on PROFIBUS DP and PROFINET IO Profile part, related to IEC 61784-3-3 Specification for PROFIBUS and PROFINET. Version 2.4, March, 2007, Order No: 3.192b" or similar.

There can also be provision in the safety control unit for a different internal safety architecture than the 1oo2 (1 out of 2) architecture described above, consisting of (and thus including) two processors, for example a 1oo3 architecture, etc. In the 1oo2 architecture described, the first processor, which directly accesses the dual port RAM, is not capable of ascertaining a cyclic redundancy checksum (CRC—a method for determining a check value for data in order to be able to detect errors in the transmission or storage), which is needed for generating valid messages via the interface of the dual port RAM. In an embodiment, this CRC ascertainment can only be performed by the redundant processor, and communicated to the first processor. This ensures that both processors collaborate on valid messages. In an embodiment, this is necessary in order to ensure the safety of the system in the event of failure or erroneous operation of one of the two processors of the safety control unit.

The splitting, according to the invention, of the non-safety-oriented, first control unit and the safety control unit into respective master and/or minion subunits is typically, but not necessarily, realized by means of program logic in this case.

Figure 1:
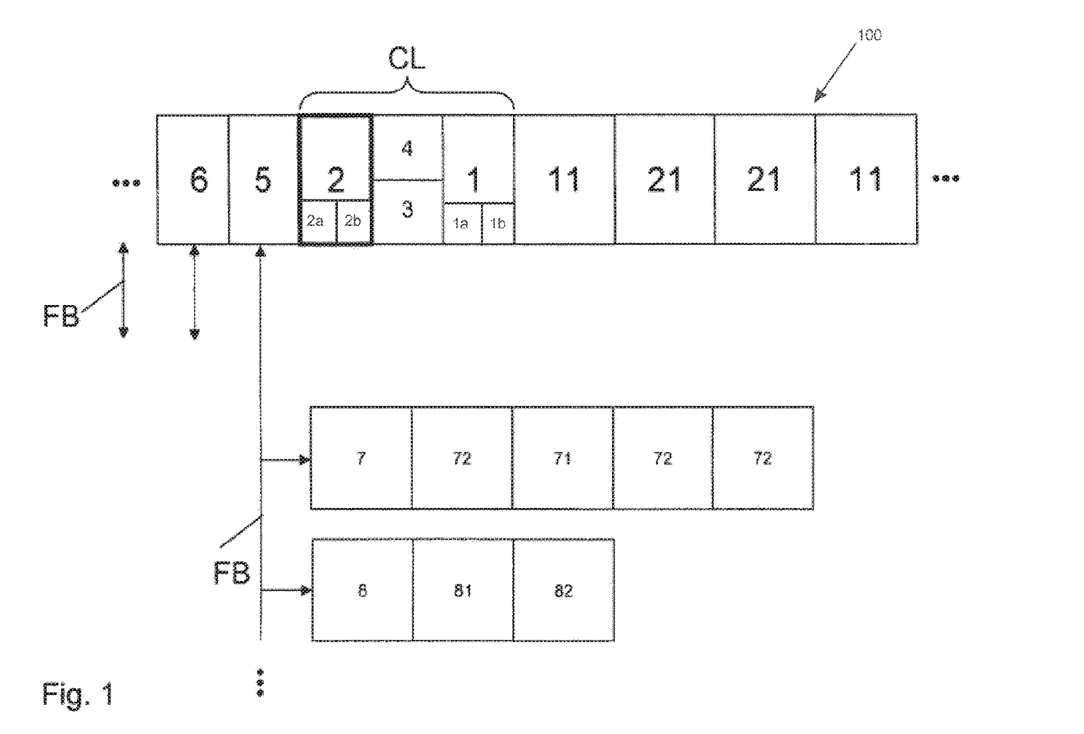
FIG. 1 shows a control system according to an embodiment. The control system includes a master and/or minion functionality that is intended to control safety-oriented and non-safety-oriented processes via field bus, with a further actuated unit.

FIG. 1 shows a control or automation system 100, 101, preferably of modular design, having a first control unit 1 that is intended to control non-safety-critical processes and/or non-safety-critical installation components. The first control unit 1 has at least one master subunit 1a and/or at least one minion subunit 1b, which are typically realized within the control unit 1 in program logic. Modules, connected thereto, of the central input/output units 11, 21 are connected to the first control unit 1 via an internal input/output bus (not shown in FIG. 1). The control unit 1 is connected to a field bus FB using at least one communication coupler 5, 6, comprising at least one master communication coupler 5 and/or at least one minion communication coupler 6, which use the field bus FB to undertake the communication with a multiplicity of local field bus minions 7, 8 and input/output units 71, 72, 81, 82 connected thereto.

The input/output units 71, 81 denote non-safety input/output units, and the input/output units 72, 82 denote safety input/output units. In accordance with the nomenclature, the master communication coupler 5 can control the communication in this case, or the minion communication coupler 6 can be controlled by a control unit of another control system or device. FIG. 1 depicts only a connection of the actively controlling master communication coupler 5, the connection of the minion communication coupler 6 being optional in this case; this is discussed more precisely below with reference to FIG. 4.

Generally, the control system 100, 101 in accordance with exemplary embodiments is designed to act as communication master or as communication minion or as both simultaneously or quasi-simultaneously in a pool connected via field bus FB with other devices. To that end, it comprises a master communication coupler (5) and/or a minion communication coupler (6), in particular even both. In exemplary embodiments, at least one of the other/further devices in the pool is likewise a control system 100, 101 in accordance with exemplary embodiments that typically functions as a minion in this case, and the first system functions as master.

In the exemplary embodiment of FIG. 1, there is provision for at least one second control unit 2, also called safety control unit 2. This is used for controlling safety-critical applications and/or safety-critical installation components. The safety control unit 2 comprises at least one master safety subunit 2a and/or at least one minion safety subunit 2b, which are typically realized in program logic. The safety control unit 2 communicates directly with at least one of the communication couplers 5, 6 via a dual port RAM and the internal coupler bus B1 by means of or via the non-safety-critical control unit 1.

The control unit 1 designed to control non-safety-critical processes and/or non-safety-critical installation components also comprises respective subunits with master functionality 1a and subunits with minion functionalities 1b.

Input and output units typically comprise both safe units 21, 72, 82 and non-safe units 11, 71, 81, the non-safe units 11, 71, 81 being able to be controlled by the first control unit 1 without a safety function, and the safe units 21, 72, 81 being able to be controlled by the safety control unit 2 with a safety function.

The safe and non-safe control units 1, 2 communicate with one another via an internal coupler bus B1 and a dual port RAM DPR1 integrated in the second control unit 2, and also via the internal coupler bus B1 and by means of the master and minion communication couplers 5, 6 with arbitrary other, preferably local, units connected to the field bus FB.

Both the modules of the central input/output units 11, 21, which modules are connected directly to the module for the central unit CL, and the modules of the local units 7, 8, 71, 72, 81, 82 can, as already stated, be embodied either as safety-oriented or as non-safety-oriented devices according to their function. They are typically configured as minions.

The central unit CL is able, like the input/output units 11, 21 and the communication couplers 5, 6 too, to be arranged by means of a module support on a baseplate having different expansion capability, wherein the input/output units 11, 21 are directly couplable to the central unit CL and the communication couplers 5, 6. The baseplate further has at least one slot for a coupler for the field bus port for a standard field bus connection to the local units 7, 8 and/or stations.

In an embodiment, the baseplate is snapped onto a standard top hat rail, wherein at least one of the input/output units 11, 21 is likewise able to be snapped onto the top hat rail and able to be electrically and mechanically assembled with the respective baseplate.

Advantageously, it is furthermore found that modules of the central unit CL, of the input/output units 11, 21 and the master/minion communication couplers 5, 6 are all electrically connectable or connected to one another wirelessly via plug connections. Preferably, the central unit CL, the input/output units 11, 21 and the master/minion communication couplers 5, 6 are each detachably connectable or connected to one another by means of plug-in and/or latching means.

Figure 2:
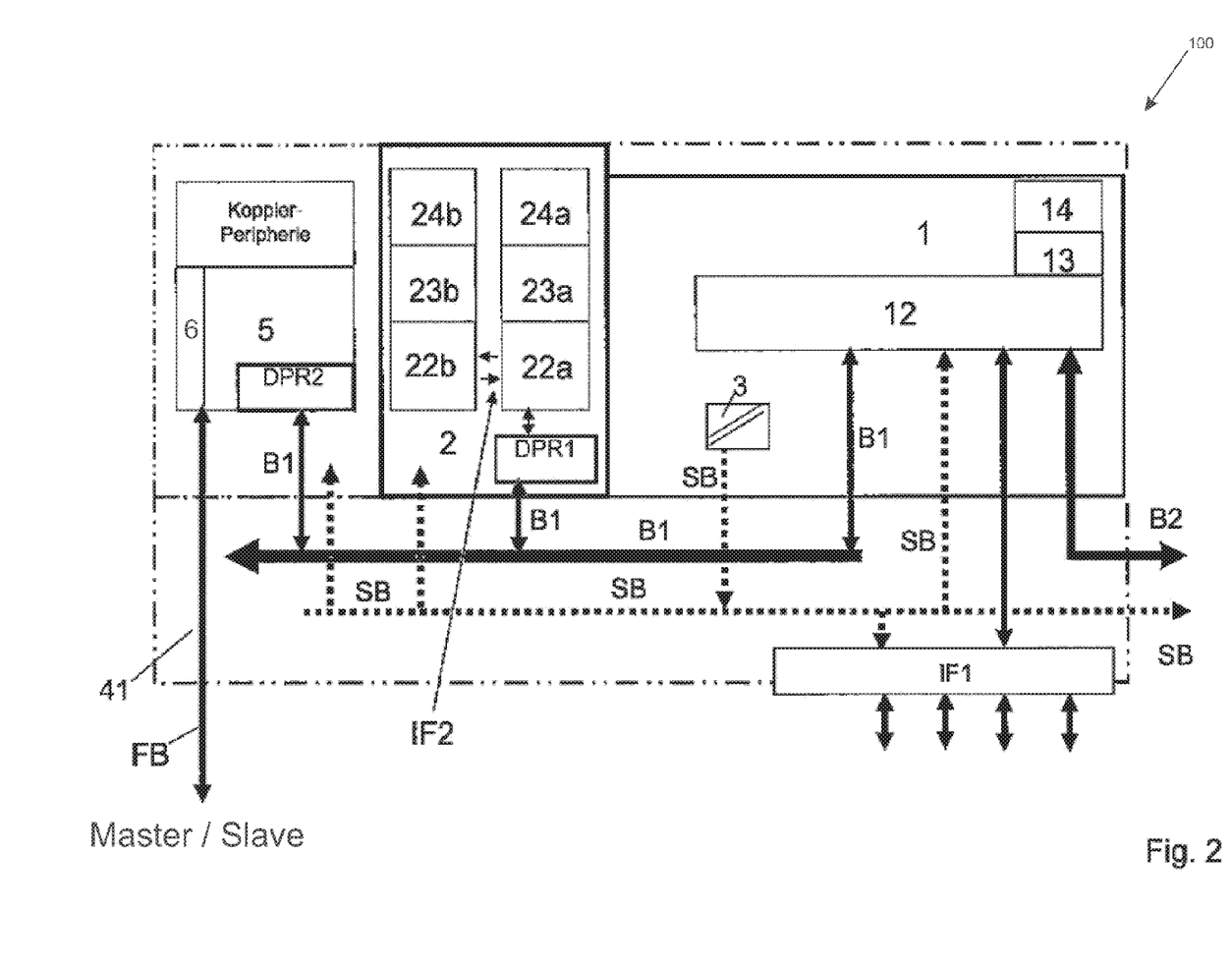
FIG. 2 shows an embodiment of the control system with additional details.

FIG. 2 shows a detailed view of a control system 100 of modular design in accordance with an embodiment (i.e., according to an example). The control system typically comprises a terminal block (not depicted), having an integrated Ethernet and/or serial interface IF1, and the first control unit 1, which uses the internal input/output coupler bus B1 to communicate with the second control unit, which is embodied as a safety control unit 2, and with the master communication coupler 5 and/or the minion communication coupler 6—of these, in exemplary embodiments, only one of the communication couplers in each case (master or minion), or both (master and minion), can be realized, the latter also in a common module. The module of the first control unit 1 is equipped with a power supply unit 3, which is electrically connected to the first and second control units 1, 2 and to the communication couplers 5, 6 via a connecting line SB. Further devices arranged on the baseplate, such as for example the central input/output units 11, 21, are also electrically connectable to the connecting line SB.

The first control unit 1 has not only a clock generator 14 and a memory 13 but also a first microprocessor 12, which uses the internal input/output coupler bus B1 to communicate with the at least one master communication coupler 5 and/or minion communication coupler 6 via a further dual port RAM DPR2 integrated comprising these communication coupler module. The connection to the central input/output units 11, 21 (not shown in FIG. 2) is realized via the internal input/output bus B2.

For use of the control system for safety-critical application too, there is provision on the baseplate for the safety control unit 2, which has at least two further processing units 22a, 22b, embodied as safety processors, for the associated memories 23a, 23b and clock generators 24a, 24b. The processors 22a, 22b synchronize to one another via a further interface IF2. The design of the processors 22a, 22b and the operation thereof are known from the relevant prior art.

In the 1oo2 architecture described, the first processor 22a, which directly accesses the dual port RAM DPR1, is not capable of ascertaining a Cyclic Redundancy Checksum (CFC) required for generating valid messages via the interface of the dual port RAM DPR1. This CRC ascertainment can only be performed by the redundant processor 22b and communicated to the first processor 22a. This ensures that both processors 22a, 22b collaborate on valid messages. This is necessary in order to ensure the safety of the system in the event of failure or erroneous operation of one of the two processors 22a, 22b of the safety control unit 2.

The further dual port RAM DPR2 integrated in the communication coupler module is used by the safety control unit 2 to transmit the safety-oriented messages from and to the local input/output units 71, 72, 81, 82, and/or to the remote devices and further devices or stations on the field bus FB, typically using the aforementioned "black channel communication principle". To this end, the messages are routed to the input/output units 71, 72, 81, 82 via the field bus FB and the "typically" field bus minions 7, 8.

The safety control unit 2 uses its dual port RAM DPR1 and uses the internal coupler bus B1 to communicate with the master communication coupler 5 or with the salve communication coupler 6 via the non-safety-critical first control unit 1 using the integrated dual port RAM DPR2. The communication is typically, but not necessarily, likewise carried out by using the aforementioned black channel communication principle.

Safety program logic is executed in the further processors 22a, 22b of the safety control unit 2. Separately from this, non-safety-oriented program logic is executed in the microprocessor 12 of the first control unit 1. The data interchange for the data between the safety control unit 2 and the first control unit 1 for the non-safety-critical applications is effected by means of the predefined interface via the first dual port RAM DPR1 arranged in the safety control unit. The aforementioned processes take place, as outlined above, between the master safety subunit 2a and the master subunit 1a, or between the minion safety subunit 2b and the minion subunit 1b, in each case, according to the configuration of the control system 100. These respective subunits of the first control unit 1 and of the safety control unit 2 are not depicted in FIG. 2 for illustrative reasons, since they can typically, but not necessarily, be realized only in program logic, in other cases also in hardware.

Figure 3:
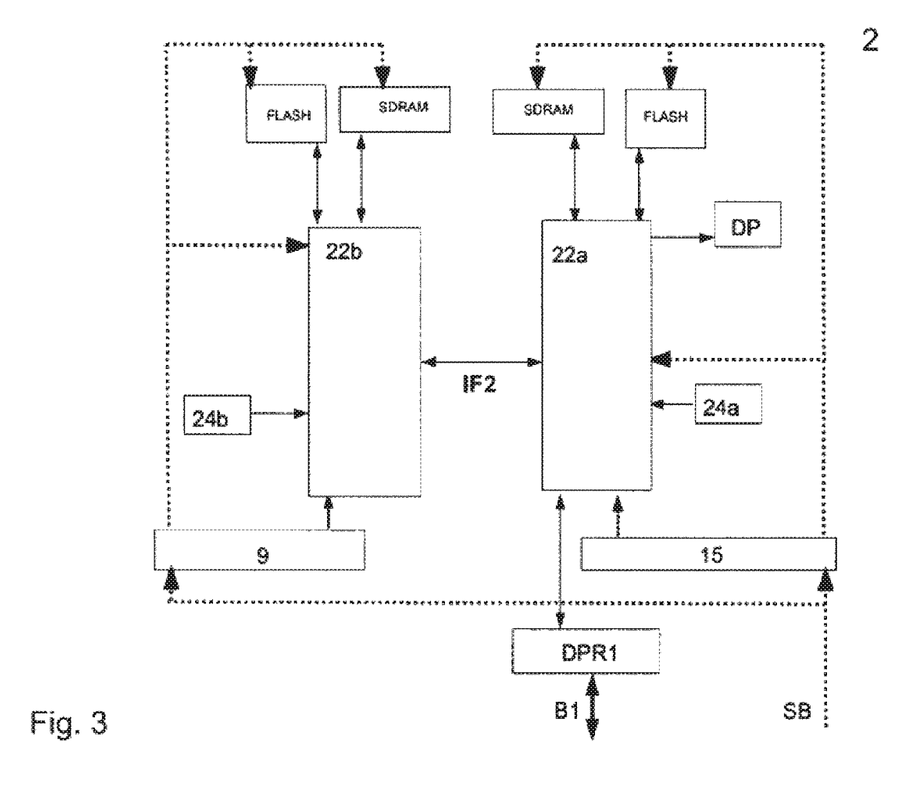
FIG. 3 shows an embodiment of a second control unit with 1oo2 system architecture.

FIG. 3 shows an embodiment of the safety control unit 2 as a 1oo2 system architecture with the microprocessors 22a, 22b, and with the respective individual nonvolatile memories FLASH, which are preferably intended as a store for a user program, cooperating with the processors 22a, 22b, and the volatile memories SDRAM, which are preferably intended as data memories. The microprocessors 22a, 22b each work together with a clock generator 24a, 24b of their own. Furthermore, there is typically provision for display means DP for displaying status and error reports, which are preferably directly connected only to the first processor 22a. The master safety subunit 2a and the minion safety subunit 2b of the safety control unit 2 are embodied in program logic in the example and are therefore not depicted explicitly.

Of the two processors 22a, 22b of the safety control unit 2, only the first processor 22a is directly connected to the internal coupler bus B1 (see FIG. 2) via the first dual port RAM DPR1.

In one advantageous refinement, the processors 22a, 22b of the safety control unit 2 are embodied such that they monitor one another. To this end, the processors 22a, 22b synchronize to one another via the further interface IF2. The monitoring an synchronization mechanisms can be executed for example according to "PROFIsafe—Profile for Safety Technology on PROFIBUS DP and PROFINET IO Profile part, related to IEC 61784-3-3 Specification for PROFIBUS and PROFINET. Version 2.4, March, 2007, Order No: 3.192b" or similar.

The power supply SB both for the two processors 22a, 22b, the memories FLASH, SDRAM and for the respective power supply monitoring and diagnoses units 9, 15 connected to the processors 22a, 22b is provided via the connecting line SB.

In exemplary embodiments, the processors 22a, 22b that are in the safety control unit 2 typically each have provision for a separate power supply monitoring and diagnosis unit 9, 15 of their own.

Figure 4:
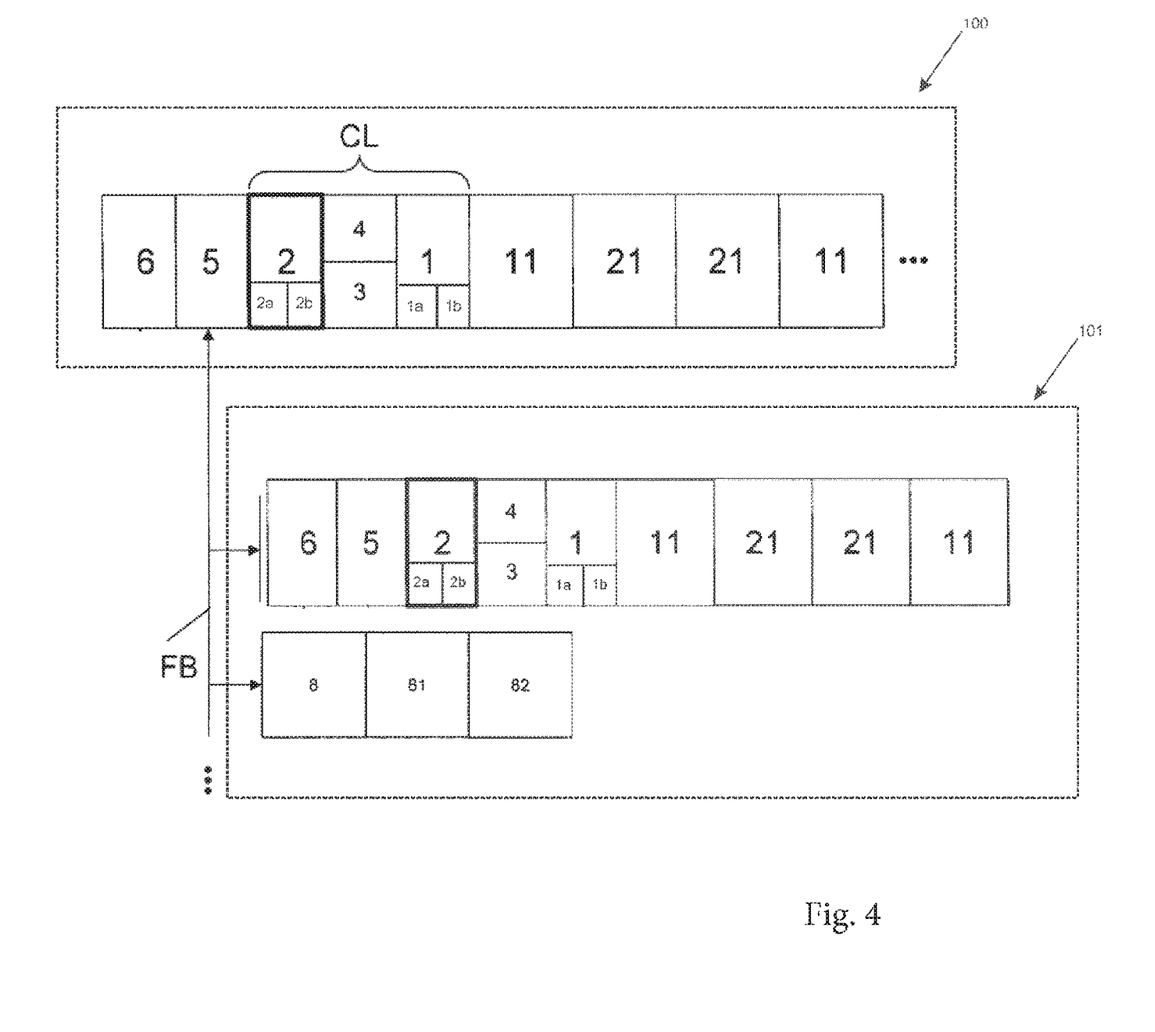
FIG. 4 shows a control system as in FIG. 1 that, as a master, actuates a further control according to an embodiment and also a further unit, a minion, in each case via field bus.

FIG. 4 shows a control system 100 like the one shown in FIG. 1, which is connected to a further control system 101 in accordance with exemplary embodiments by means of the master communication coupler 5 via a field bus FB. Said further control system is connected to the field bus FB via its minion communication coupler 6. Additionally, the control system 100, similarly to what is shown in FIG. 1, controls a local field bus minion 8 and input/output units 81, 82 connected thereto.

In the control system 100, 101, the first control unit 1, the non-safety-controller, performs the task of routing safety messages from the safety control unit 2 having the safety communication master 2a and the safety communication minion 2b to the master communication coupler 5 or the minion communication coupler 6. To this end, it uses the internal coupler bus B1. The safety control unit 2 executes the safety program logic and contains safety communication master functionality and safety communication minion functionality. The non-safety controller 1 executes a non-safety program logic separately. The program data interchange between the safety and non-safety controllers is supported via the predefined interface by the dual port RAM. Only one of the microprocessors in the safety controller has access to the dual port RAM.

In order to allow the safety-relevant and non-safety-relevant data interchange between one or more control systems 100, 101, each control system 100, 101 needs to have safety communication master functionality and safety communication minion functionality. In the example of FIG. 4, each control system 100, 101 accordingly has a master communication coupler 5 and a minion communication coupler 6. In this manner, different control systems 100, 101 can comprise safety communication master functionality and safety communication minion functionality at the same time and, if they are correctly configured and connected, can interchange both safety and non-safety data.

This will be explained in more detail below using two examples.

In a first example, the data transfer from the non-safety controller 1 in a first control system 100 to the communication master coupler 5 of the first control system 100, then via the field bus to the minion communication coupler 6' of the second control system 101, from there by means of the non-safety controller 1' in the second control system 101 to the communication master coupler 5' of the second control system 101 and then on to a remote communication minion 8 and input/output units 81, 82 connected thereto is effected using a non-safety I/O unit 81 and a safety I/O unit 82.

In a second example, safety communication is implemented. This involves the data being transmitted from the safety controller 2 having safety communication master 2a in the first control system 100 to the non-safety controller 1 in the first control system 100 and then on to the connected master communication coupler 5. From there, it goes via the field bus FB to the minion communication coupler 6' of the second control system 101, and then via the non-safety controller 1' to the safety controller 2' having the safety communication minion functionality 2b', and from there on to the safety communication master 2a' as part of the safety controller 2', and then back to the non-safety controller 1' and from there on to the connected communication master coupler 5' of the second control system 101 and then on to a remote communication minion 8 having the remote safety I/O unit 82, which support safety minion communication.

The safety controllers 2, 2' can comprise both safety communication master functionalities 2a, 2a' and communication minion functionalities 2b, 2b'. Therefore, depending on the requirement on the given control system, it is possible to suitably select whether a control system 100, 101 according to the invention is meant to have e.g. only safety communication master functionality, only safety communication minion functionality or both.

Disclosed is a control system (100, 101) for controlling safety-critical, non-safety-critical processes, and/or system components. The system includes at least one control unit (1) which is designed to control non-safety-critical processes and/or non-safety-critical system components, at least one safety control unit (2) for controlling safety-critical processes and/or safety-critical system components, and at least one input/output unit (11, 21) which is connected to the first control unit (1) via an internal input/output bus (B2), wherein the control system (100, 101) is designed to operate as the communications master or as the communications minion, or as both, in combination with other devices connected via a fieldbus (FB), and wherein the control system also comprises a master communications coupler (5) and a minion communications coupler (6).

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A control system for controlling safety-critical processes, non-safety-critical processes, and/or installation components, the control system comprising:
   at least one control unit configured to control non-safety-critical processes and/or non-safety-critical installation components,
   at least one safety control unit for controlling safety-critical processes and/or safety-critical installation components, and
   at least one input/output unit connected to a first control unit via an internal input/output bus,
   wherein the control system is configured to act as communication master or as communication minion or as both in a pool having other devices that is connected via field bus, and to that end, the control system comprises a master communication coupler and a minion communication coupler,
   wherein the control system is modularly configurable, and wherein at least the safety control unit comprises respective subunits with master functionality and subunits with minion functionalities.

2. The control system of claim 1, wherein the control unit configured to control non-safety-critical processes and/or non-safety-critical installation components comprises respective subunits with master functionality and subunits with minion functionalities.

3. The control system of claim 1, wherein the respective subunits are realized in program logic provided in a non-volatile memory.

4. The control system of claim 1, wherein the safety control unit is configured to communicate with the control unit via an internal coupler bus, and wherein the control unit is configured to transmit data from the safety control unit to the communication coupler via the internal coupler bus.

5. The control system of claim 1, as input/output units comprising both safety-oriented units and non-safety-oriented input/output units wherein the non-safety-oriented input/output units are controllable by the first control unit, and the safety-oriented input/output units are controllable by the safety control unit.

6. The control system of claim 1, wherein the safety control unit comprises at least two processors and a first dual port RAM to provide the safety-oriented functions, wherein only one of the two processors is connected to the first dual port RAM, and
wherein a second control unit is configured to communicate with the first control unit via the first dual port RAM and the internal coupler bus, and the first control unit is configured to transmit the data from the second control unit to the communication coupler via the internal coupler bus and a further dual port RAM integrated in the communication coupler, and
wherein the dual port RAMs have predefined standard interfaces.

7. The control system of claim 1, wherein the processors of the safety control unit are configured such that they monitor and synchronize one another.

8. A method of using the control system of claim 1, the method comprising:
using the control system as a control system with master functionality in an automation system that includes at least one further control system with minion functionality, or
using the control system as a local processing device in an automation system.

9. The control system of claim 5, wherein the master communication coupler is configured to transmit safety-oriented messages from and to the local input/output units and/or to remote stations by using a black channel communication principle.

10. The control system of claim 9, wherein the safety-oriented messages are routed to the local input/output units via field bus minions.

* * * * *